United States Patent
Kelm

(10) Patent No.: US 8,136,757 B2
(45) Date of Patent: Mar. 20, 2012

(54) WING AND METHOD FOR REDUCING EFFECTS OF PROPELLER AIRFLOW ON LIFT DISTRIBUTION

(75) Inventor: Roland Kelm, Hamburg (DE)

(73) Assignee: Airbus Operations GmbH (DE)

( * ) Notice: Subject to any disclaimer, the term of this patent is extended or adjusted under 35 U.S.C. 154(b) by 608 days.

(21) Appl. No.: 12/316,254

(22) Filed: Dec. 10, 2008

(65) Prior Publication Data

US 2009/0152405 A1 Jun. 18, 2009

Related U.S. Application Data

(60) Provisional application No. 61/007,654, filed on Dec. 14, 2007.

(30) Foreign Application Priority Data

Dec. 14, 2007 (DE) .......................... 10 2007 060 253

(51) Int. Cl.
*B64C 23/00* (2006.01)
(52) U.S. Cl. ...................................... 244/75.1; 244/130
(58) Field of Classification Search .................. 244/75.1, 244/76 A, 76 B, 130
See application file for complete search history.

(56) References Cited

U.S. PATENT DOCUMENTS

| 934,771 | A | | 9/1909 | Turnbull | |
|---|---|---|---|---|---|
| 2,714,495 | A | * | 8/1955 | Focke | 244/218 |
| 2,979,287 | A | * | 4/1961 | Ross | 244/219 |
| 3,096,043 | A | * | 7/1963 | Labussiere | 244/12.5 |
| 3,166,271 | A | * | 1/1965 | Zuck | 244/7 C |
| 3,223,356 | A | * | 12/1965 | Alvarez-Calderon | 244/216 |

FOREIGN PATENT DOCUMENTS

DE 396621 C 10/1924

* cited by examiner

*Primary Examiner* — Galen Barefoot
(74) *Attorney, Agent, or Firm* — Lerner, David, Littenberg, Krumholz & Mentlik, LLP

(57) ABSTRACT

A wing for an aircraft includes a non-balanced lift gradient because as a result of at least one propeller slipstream flowing onto the wing the induced drag of the wing is increased. To reduce the increased induced drag, the wing comprises a first region with a reduced local wing camber and/or reduced local twist, and a second region with an increased local wing camber and/or increased local twist. The first region is defined as a wing surface situated downstream of the propeller slipstream, upstream of which wing surface the blades of the propeller move upwards. The second region is defined as a wing surface situated downstream of the propeller slipstream, upstream of which wing surface the blades of the propeller move downwards.

12 Claims, 1 Drawing Sheet

WING AND METHOD FOR REDUCING EFFECTS OF PROPELLER AIRFLOW ON LIFT DISTRIBUTION

CROSS-REFERENCE TO RELATED APPLICATIONS

This application claims the benefit of the filing date of U.S. Provisional Patent Application No. 61/007,654 filed Dec. 14, 2007, the disclosure of which is hereby incorporated herein by reference.

BACKGROUND OF THE INVENTION

The invention relates to a wing and a method for reducing the induced drag that is increased as a result of at least one propeller slipstream flowing onto a wing.

With propeller-driven aircraft there is an aerodynamic interaction between the propeller slipstream and the flow around the wing. This is of great significance in particular if the propeller/s is/are situated in front of the wing, for example in turboprop aircraft, e.g. the A400M. During operation propellers not only produce a thrust-generating flow component that acts in longitudinal direction of the aircraft, but also a flow component in circumferential direction of the propeller. This results in a propeller air flow (hereinafter also referred to as a "propeller slipstream") that impinges in a helical or spiral shape on the wing surface that is situated behind it. Depending on the direction of rotation of the respective propeller this results in an increase or reduction in the local angle of attack on the wing. Consequently the lift distribution of the wing shows local increases or reductions in lift. As a result of such unevenness in the lift distribution the induced drag of the wing is increased.

From prior art, modifications of the wing leading edge are known which reduce disturbance caused by a propeller slipstream. The modifications have primarily been designed in order to delay airflow separation. However, in the case of non-separated airflow the influence on the wing lift distribution is small. Consequently the reduction in the induced drag is also relatively small.

BRIEF SUMMARY OF THE INVENTION

According to an exemplary embodiment of the present invention a wing for an aircraft is provided, as stated in claim 1, which wing, for reducing the induced drag that is increased as a result of at least one propeller slipstream flowing onto the wing, may comprise a first region with a reduced local wing camber and/or reduced local twist, and a second region with an increased local wing camber and/or increased local twist, wherein the first region is defined as a wing surface situated downstream of the propeller slipstream, upstream of which wing surface the blades of the propeller move upwards, and wherein the second region is defined as a wing surface situated downstream of the propeller slipstream, upstream of which wing surface the blades of the propeller move downwards.

This may provide for a suitable modification of a wing that results in a reduction of the induced drag that is increased by at least one propeller slipstream that flows onto the wing.

A reduction in the local wing camber, or a reduction in the local twist of a wing results in the lift coefficient of the wing decreasing at this position. The first region in which these first modifications are carried out is situated downstream of the upwards-moving propeller blades. As mentioned in the introduction, the upwards-moving propeller blades not only generate a flow component in longitudinal direction or in the direction of thrust, but also an upwards-directed flow component, which on the area behind it results in an increased local angle of attack and thus in increased lift. This increased lift may ideally be compensated for by a concurrent reduction in the lift coefficient of this area at a specific operating point. This operating point could, for example, be present as a cruising state. Equally, in the second region the local lift coefficient may have to be increased by increasing the local wing camber or increasing the local twist of the wing, because in this second region the angle of attack is reduced as a result of the downwards-moving propeller blades in front of this region, and the resulting downwards-directed flow component.

By targeted compensation of the lift increase or lift reduction caused by the propeller slipstream effects, a balanced lift distribution occurs at a specific operating point, so that at least in this region, there is no increase in the induced drag.

As stated in the subordinate claims, this modification may advantageously be improved. For example, an improvement may result in the modification of the wing being carried out in the form of an exclusive reduction or increase in the local wing camber. This is associated with the advantage that this change in the local wing camber does not have to lead to a complete new construction of the wing, but instead could be provided by a trailing edge flap. The use of a trailing edge flap advantageously may also result in the adaptation of the local wing camber being able to be carried out not only in relation to a specified operating point (for example cruising), but also in relation to other operating points, in the optimum case in relation to any desired operating point. According to another advantageous improvement of this wing, the wing may be negatively twisted in the first region, and positively twisted in the second region in relation to the surrounding regions of the wing.

This may also provide for a method for reducing the induced drag that is increased as a result of at least one propeller slipstream flowing onto a wing, as stated in the independent method-related claim. Finally, this may also provide for an aircraft comprising a wing according to the above explanations.

BRIEF DESCRIPTION OF THE DRAWINGS

Below, the invention is explained in more detail with reference to the figures. In the figures the same reference characters are used for identical objects. The following are shown.

DETAILED DESCRIPTION

Figure 1A:
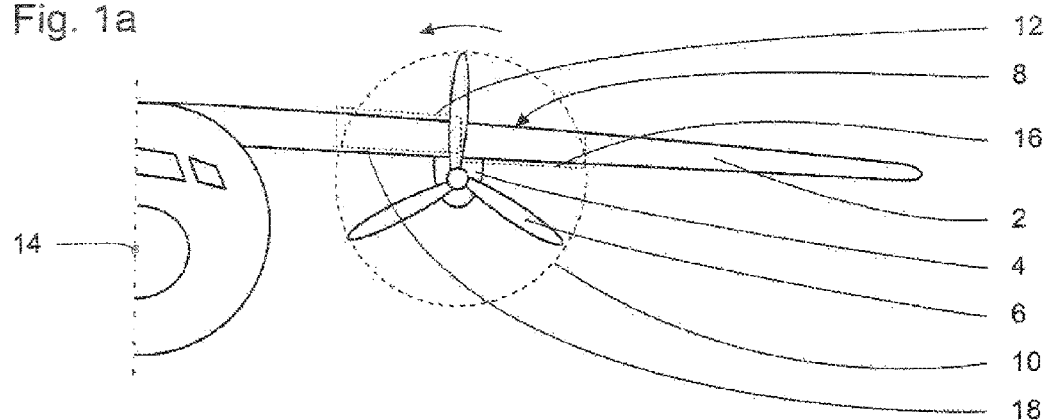
FIG. 1a: a front view of a wing according to the invention.

FIG. 1a shows a wing 2 on which a propulsion unit 4 with a propeller 6 is arranged. The direction of rotation of the propeller is mathematically positive in the drawing plane, in other words the propeller rotates counterclockwise. On the wing 2, the first region 8 is marked, which is situated behind the right-hand half of the propeller plane 10; as is the second region 12, which is situated behind the left-hand half of the propeller plane 10. Due to the direction of rotation of the propeller 6, an upwards directed flow component acts on the first region 8, and a downwards directed flow component acts on the second region 12. These two vertical flow components are superimposed in the horizontal main flow, which is essentially present in a longitudinal direction parallel to the longitudinal axis 14 of the aircraft.

In the drawing plane of 1a a negative twist in the first region 8 is shown by a dotted line 16; in the second region the positive twist is shown by the dotted line 18. In an exemplary manner this shows one of the options as to how the local angle of attack of the first region 8 and of the second region 12 may be matched to a given situation.

Figure 1B:
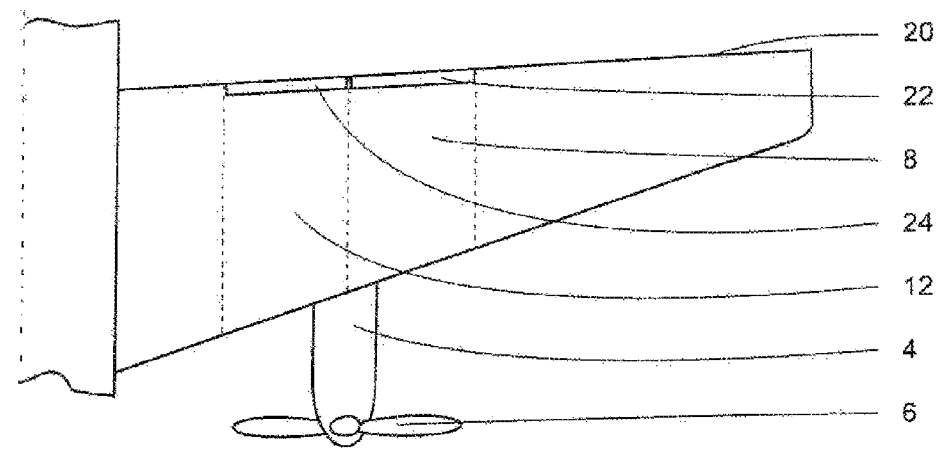
FIG. 1b: a top view of a wing according to the invention.

FIG. 1b shows a top view of the wing 2, on whose trailing edge 20 there are two flaps 22 and 24 whose function it is to reduce the wing camber in the first region, and increase it in the second region. In this way, too, it is possible, by changing the lift coefficients of the first region 8 and of the second region 12 to compensate for the effects of the propeller slipstream.

Figure 1C:
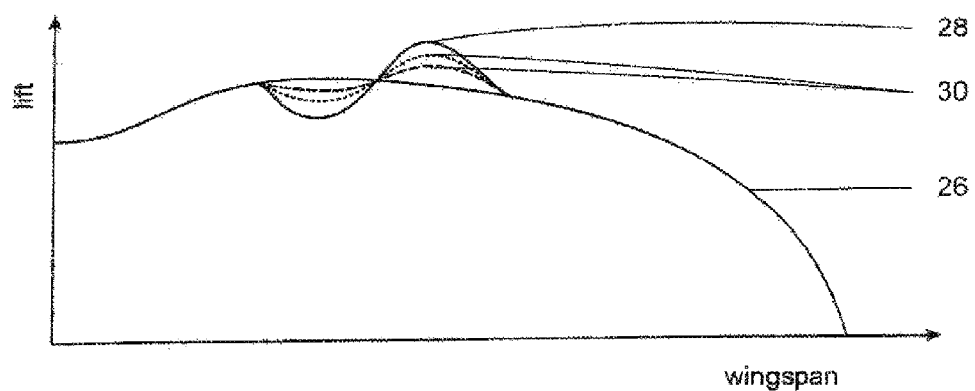
FIG. 1c: a lift graph showing the wingspan without propeller, with propeller, and with propeller plus modifications according to the invention.

Finally, FIG. 1c shows a comparison as to how the measures according to the invention influence the lift distribution across the wing. The actual lift distribution of the wing 2 is shown by a very continually-curved curve 26. The influence which the propeller 6 has on the lift distribution is shown by the superimposed curve 28, which in its left-hand half reduces the original lift value of the curve 26, and in its right-hand half increases the lift value. By means of suitable modification of the first region 8 and of the second region 12, lift distributions 30 may be obtained that are situated between the curves 26 and 28. Ideally, the curve 30 approximates the curve 26 at the respective operating point so that as a result of the principle according to the invention the lift distribution is evened out.

Exemplary embodiments of the invention presented are not to be interpreted as limitations. Instead, other modifications are imaginable that result in an increase or reduction in the angle of attack or lift coefficient as a result of a modified camber or modified local twist. Furthermore, the object of the invention is not limited to the use of one propeller for each aircraft/wing; any desired number of propellers are imaginable so that, for each propeller used, modification that is situated downstream of the propeller slipstream may be carried out on a wing, which leads to a wing according to the invention or to a method according to the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A wing for an aircraft for reducing the induced drag that is increased as a result of at least one propeller slipstream flowing onto the wing, the wing comprising:
a first region with at least one of a reduced local wing camber and reduced local twist, and a second region with at least one of an increased local wing camber and increased local twist,
wherein the first region is defined as a wing surface situated downstream of the propeller slipstream, upstream of which wing surface the blades of the propeller move upwards, and
wherein the second region is defined as a wing surface situated downstream of the propeller slipstream, upstream of which wing surface the blades of the propeller move downwards;

in which the first region comprises a reduced local wing camber, and the second region comprises an increased local wing camber.

2. The wing of claim 1, which comprises two adjacent trailing edge flaps on each side of the wing deflectable in opposite directions for providing the reduced local wing camber of the first region, and the increased local wing camber of the second region.

3. The wing of claim 2, in which the two trailing edge flaps on each side of the wing are respectively equipped for being set to a flight operating point to vary at least one of the reduced local wing camber of the first region, and the increased local wing camber of the second region.

4. The wing of claim 2, which for moving the two trailing edge flaps on each side of the wing comprises an actuator that is connected to the two trailing edge flaps on each side of the wing.

5. The wing of claim 1, in which the wing is negatively twisted with a wing leading edge downwards in the first region, and positively twisted with a wing leading edge upwards in the second region in relation to surrounding regions of the wing.

6. A method for reducing the induced drag that is increased as a result of at least one propeller slipstream flowing onto a wing, comprising:
reducing the local lift coefficient of the wing in a first region by use of at least one of a reduced local wing camber and reduced local twist, and increasing the local lift coefficient in a second region by use of at least one of an increased local wing camber and increased local twist,
wherein the first region is defined as a wing surface situated downstream of the propeller slipstream, upstream of which wing surface the blades of the propeller move upwards, and
wherein the second region is defined as a wing surface situated downstream of the propeller slipstream, upstream of which wing surface the blades of the propeller move downwards.

7. The method of claim 6, further comprising reducing at least one of the local wing camber of the first region and the local wing camber of the second region by at least one trailing edge flap.

8. An aircraft comprising a wing for reducing the induced drag that is increased as a result of at least one propeller slipstream flowing onto the wing, the wing comprising:
a first region with at least one of a reduced local wing camber and reduced local twist, and a second region with at least one of an increased local wing camber and increased local twist,
wherein the first region is defined as a wing surface situated downstream of the propeller slipstream, upstream of which wing surface the blades of the propeller move upwards, and
wherein the second region is defined as a wing surface situated downstream of the propeller slipstream, upstream of which wing surface the blades of the propeller move downwards.

9. A wing for an aircraft for reducing the induced drag that is increased as a result of at least one propeller slipstream flowing onto the wing, the wing comprising:
a first region with at least one of a reduced local wing camber and reduced local twist,
a second region with at least one of an increased local wing camber and increased local twist, wherein the first region is defined as a wing surface situated downstream of the propeller slipstream, upstream of which wing surface the blades of the propeller move upwards, and wherein the second region is defined as a wing surface situated downstream of the propeller slipstream, upstream of which wing surface the blades of the propeller move downwards, and which wing comprises two adjacent trailing edge flaps on each side of the wing deflectable in opposite directions for providing the reduced local wing camber of the first region, and the increased local wing camber of the second region.

10. The wing of claim 9, in which the two trailing edge flaps on each side of the wing are respectively equipped for being set to a flight operating point to vary at least one of the reduced local wing camber of the first region, and the increased local wing camber of the second region.

11. The wing of claim 9, which for moving the two trailing edge flaps on each side of the wing comprises an actuator that is connected to the two trailing edge flaps on each side of the wing.

12. The wing of claim 9, in which the wing is negatively twisted with a wing leading edge downwards in the first region, and positively twisted with a wing leading edge upwards in the second region in relation to surrounding regions of the wing.

* * * * *